United States Patent
Takabatake et al.

(10) Patent No.: US 9,659,226 B2
(45) Date of Patent: May 23, 2017

(54) IMAGE PROCESSING APPARATUS, IMAGE PROCESSING METHOD, AND COMPUTER-READABLE RECORDING MEDIUM STORING IMAGE PROCESSING PROGRAM

(71) Applicant: PFU Limited, Ishikawa (JP)

(72) Inventors: Masanari Takabatake, Ishikawa (JP); Yuki Kasahara, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 177 days.

(21) Appl. No.: 13/682,492

(22) Filed: Nov. 20, 2012

(65) Prior Publication Data

US 2013/0194298 A1 Aug. 1, 2013

(30) Foreign Application Priority Data

Nov. 21, 2011 (JP) .................................. 2011-253952

(51) Int. Cl.
*G06K 9/46* (2006.01)
*G06T 3/00* (2006.01)
(Continued)

(52) U.S. Cl.
CPC .......... *G06K 9/4604* (2013.01); *G06T 3/0031* (2013.01); *H04N 1/387* (2013.01); *H04N 1/4092* (2013.01)

(58) Field of Classification Search
CPC .......... H04N 1/387; H04N 2201/0434; H04N 1/4092; G06T 3/0031; G06K 9/4604
(Continued)

(56) References Cited

U.S. PATENT DOCUMENTS 5,844,573 A * 12/1998 Poggio et al. ................. 345/441
7,072,527 B1 * 7/2006 Nako ........................ G06K 9/32
358/474

(Continued)

FOREIGN PATENT DOCUMENTS

CN 1607824 A 4/2005
CN 1856032 A 11/2006

(Continued)

OTHER PUBLICATIONS

Office Action Chinese Patent Application No. 201210462551.0 dated Oct. 11, 2014.

(Continued)

*Primary Examiner* — Xiao Wu
*Assistant Examiner* — Chong Wu
(74) *Attorney, Agent, or Firm* — McDermott Will & Emery LLP

(57) ABSTRACT

An image processing apparatus is configured to extract contour information of a medium area from readout image data, and correct distortion of the medium area based on the contour information. The medium area is an area for image data corresponding to a medium serving as a reading target. The image processing apparatus includes an acquiring unit that acquires the readout image data, an extracting unit that extracts the contour information of the medium area from the readout image data, a displaying unit that displays the contour information so as to superpose the contour information on the readout image data, a detecting unit that detects an instruction of changing a position of the contour information. The extracting unit extracts again the contour information by reflecting the instruction of changing, and the displaying unit redisplays the contour information extracted again by the extracting unit.

3 Claims, 7 Drawing Sheets

(51) Int. Cl.
*H04N 1/387* (2006.01)
*H04N 1/409* (2006.01)

(58) Field of Classification Search
USPC ................................ 382/132, 173, 266, 275
See application file for complete search history.

(56) References Cited

U.S. PATENT DOCUMENTS

| | | |
|---|---|---|
| 7,417,765 B2 | 8/2008 | Araki |
| 8,077,931 B1* | 12/2011 | Chatman et al. ............. 382/118 |
| 2003/0198398 A1* | 10/2003 | Guan et al. ................... 382/255 |
| 2004/0201870 A1* | 10/2004 | Araki ............................ 358/3.26 |
| 2005/0078200 A1 | 4/2005 | Morichika |
| 2009/0208130 A1* | 8/2009 | Kishi ..................... G06K 9/481 382/266 |
| 2009/0238433 A1* | 9/2009 | Rao et al. ..................... 382/132 |
| 2012/0014610 A1* | 1/2012 | Nakashi ................ G06T 7/0042 382/195 |
| 2012/0051612 A1* | 3/2012 | Kitamura et al. ............ 382/128 |
| 2012/0294528 A1* | 11/2012 | Li et al. ........................ 382/173 |

FOREIGN PATENT DOCUMENTS

| | | |
|---|---|---|
| JP | 7-046395 A | 2/1995 |
| JP | 2004-040395 A | 2/2004 |
| JP | 2005-303941 A | 10/2005 |
| JP | 2006-087027 A | 3/2006 |
| JP | 2007-213325 A | 8/2007 |
| JP | 2008-178137 A | 7/2008 |
| JP | 2011-205167 A | 10/2011 |

OTHER PUBLICATIONS

Notice of Rejection Japanese Patent Application No. 2011-253952 dated May 26, 2015 with full English translation.

* cited by examiner

IMAGE PROCESSING APPARATUS, IMAGE PROCESSING METHOD, AND COMPUTER-READABLE RECORDING MEDIUM STORING IMAGE PROCESSING PROGRAM

CROSS-REFERENCE TO RELATED APPLICATIONS

This application is based upon and claims the benefit of priority from Japanese Patent Application No. 2011-253952, filed Nov. 21, 2011, the entire contents of which are incorporated herein by reference.

BACKGROUND OF THE INVENTION

1. Field of the Invention

The present invention relates to an image processing apparatus, an image processing method, and a computer-readable recording medium storing an image processing program.

2. Description of the Related Art

When generating readout image data by reading a double-page spread type medium, such as a book, where two pages are side by side and joined to each other (hereinafter, referred to as a double-page spread type medium), using a reading device, such as an overhead scanner, an image that includes a page distorted in a semi-cylindrical shape is generated due to a thick volume and a binding portion of the medium. There has been proposed an image processing apparatus that performs processing of detecting such a shape of distortion and correcting the distortion of the readout image data based on information on the shape of the distortion that is detected (for example, see Japanese Patent Application Laid-open No. 2006-087027).

However, the conventional image processing apparatus disclosed in Japanese Patent Application Laid-open No. 2006-087027 has a configuration in which candidates of the distortion shape detected by the apparatus are presented to the user, and then the correction processing is performed depending on a result of the user's selection. Therefore, there is a concern that sufficient correction cannot be made through the processing when a candidate correctly showing the distortion shape is not included in the candidates presented by the apparatus. Therefore, the conventional image processing apparatus has still room for a further improvement in the correction processing of the readout image data.

SUMMARY OF THE INVENTION

It is an object of the present invention to at least partially solve the problems in the conventional technology.

According to an aspect of the present invention, an image processing apparatus is configured to process readout image data including a medium area which is an area for image data corresponds to a medium serving as a reading target, the processing including extracting contour information of the medium area from the readout image data, and correcting a distortion of the medium area based on the contour information, and the image processing apparatus comprises an acquiring unit that acquires the readout image data; an extracting unit that extracts the contour information of the medium area from the readout image data acquired by the acquiring unit; a displaying unit that displays the contour information extracted by the extracting unit so as to superpose the contour information on the readout image data; a detecting unit that detects an instruction of changing a position of the contour information displayed by the displaying unit with respect to the readout image data, wherein the extracting unit extracts the contour information again by reflecting the instruction of changing when the instruction of changing is detected by the detecting unit, and the displaying unit redisplays the contour information extracted again by the extracting unit.

According to another aspect of the present invention, an image processing method is for processing readout image data including a medium area which is an area for image data corresponds to a medium serving as a reading target, the processing including extracting contour information of the medium area from the readout image data, and correcting a distortion of the medium area based on the contour information, and the image processing method comprises acquiring the readout image data; extracting the contour information of the medium area from the readout image data acquired in the acquiring of the readout image data; displaying the contour information extracted in the extracting of the contour information so as to superpose the contour information on the readout image data; detecting an instruction of changing a position of the contour information displayed in the displaying of the contour information with respect to the readout image data; redoing extraction of the contour information by reflecting the instruction of changing when the instruction of changing is detected in the detecting of the instruction; and redisplaying the contour information extracted again in the redoing extraction of the contour information.

According to still another aspect of the present invention, a computer-readable recording medium storing an image processing program for processing readout image data including a medium area which is an area for image data corresponds to a medium serving as a reading target, the processing including extracting contour information of the medium area from the readout image data, and correcting a distortion of the medium area based on the contour information, and the image processing program causes the computer to perform the functions of an acquiring unit that acquires the readout image data; an extracting unit that extracts the contour information of the medium area from the readout image data acquired by the acquiring unit; a displaying unit that displays the contour information extracted by the extracting unit so as to superpose the contour information on the readout image data; a detecting unit that detects an instruction of changing a position of the contour information displayed by the displaying unit with respect to the readout image data, wherein the extracting unit extracts the contour information again by reflecting the instruction of changing when the instruction of changing is detected by the detecting unit, and the displaying unit redisplays the contour information extracted again by the extracting unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
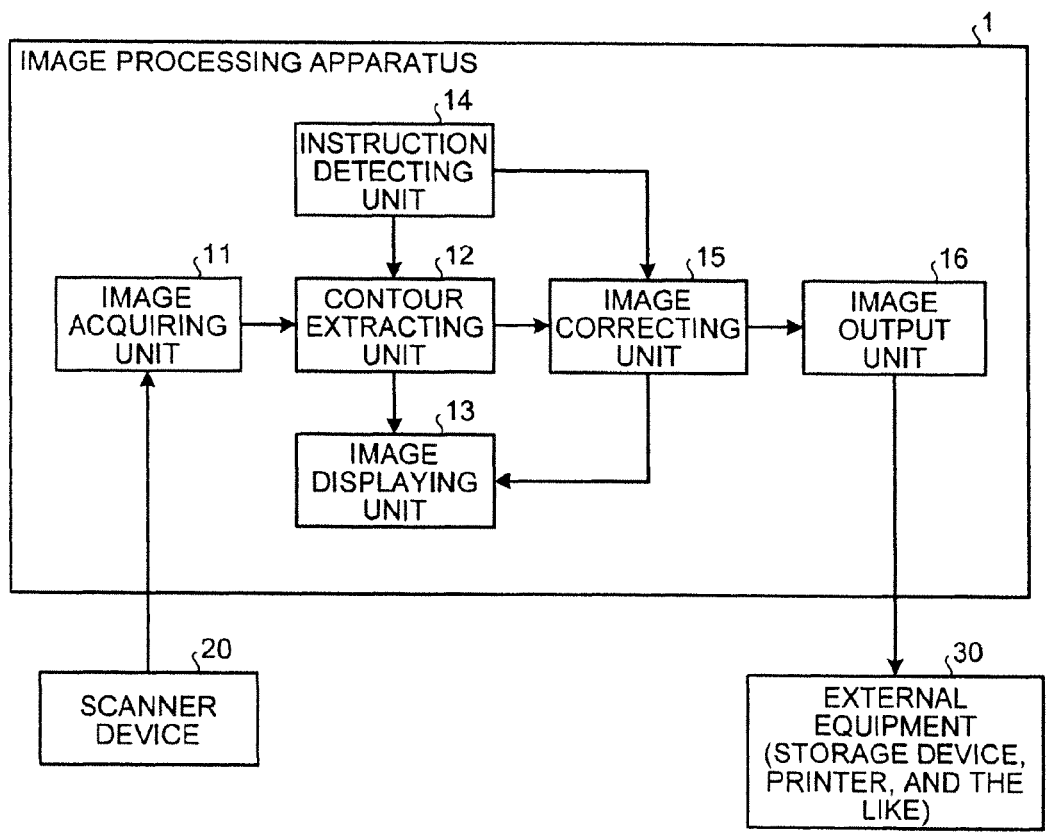
FIG. 1 is a functional block diagram that illustrates a schematic configuration of an image processing apparatus according to a first embodiment of the present invention.

Hereinbelow, embodiments of an image processing apparatus, an image processing method, and a computer-readable recording medium storing an image processing program according to the present invention are described with reference to the drawings. Moreover, an identical reference numeral is provided to a part and the same parts as that and equivalent parts to that in the drawings, and the description thereof is not repeatedly given.

First Embodiment

A first embodiment of the present invention is described with reference to FIGS. 1 to 6. First of all, a configuration of an image processing apparatus according to the present embodiment is described with reference to FIG. 1. FIG. 1 is a functional block diagram that illustrates a schematic configuration of an image processing apparatus 1 according to the present embodiment. Moreover, in the following description below, the term "vertical direction" and the term "horizontal direction" respectively imply a vertical direction and a horizontal direction as defined in FIGS. 3 and 6 unless otherwise specified.

As illustrated in FIG. 1, when readout image data is input from a scanner device 20, the image processing apparatus 1 performs correction processing on this image data and outputs the result of the correction processing to an external equipment 30 such as a storage device or a printer. The readout image data includes a medium area which is an area for image data corresponds to a medium serving as a reading target. A medium as a reading target of the image processing apparatus 1 of the present embodiment is mainly a double-page spread type medium such as a book where two pages are side by side and joined to each other by a binding portion at the center of the two side-by side pages, and the two pages on both sides of the binding are read by the scanner 20. The image processing apparatus 1 can accurately correct the readout image data including image data of distorted image (hereinafter, distorted image data) due to curvature of a page, for example, which is likely to occur in case of generating readout image data of the double-pace spread type medium, when the readout image data includes a medium area corresponding to the double-page spread type medium.

The image processing apparatus 1 includes an image acquiring unit 11 (an acquiring unit), a contour extracting unit 12 (an extracting unit), an image displaying unit 13 (a displaying unit), an instruction detecting unit 14 (a detecting unit), an image correcting unit 15, and an image output unit 16.

The scanner device 20 reads the medium and generates the readout image data, The image acquiring unit 11 acquires the readout image data from the scanner device 20.

The contour extracting unit 12 extracts contour information of the medium from the readout image data acquired by the image acquiring unit 11. The contour information is information related to the contour of the medium serving as the reading target, and the contour information includes, for example, "corner points" that show the positions of the corners of a medium area and contour lines, each connecting the corner points to each other.

Moreover, when a contour correction instruction from the instruction detecting units 14, which is described later, is received, the contour extracting unit 12 extracts again the contour information by reflecting information included in the correction instruction.

The image displaying unit 13 displays a contour extraction result image obtained by superposing the contour information extracted (or extracted again) by the contour extracting unit 12 on the contour of the medium area of the readout image data, for example, on a displaying device, such as a display to present it a user.

The instruction detecting unit 14 detects an input of instruction by the user which is input through an input device such as a mouse, a keyboard, and a touch panel.

Specifically, the instruction detecting unit 14 detects the fact that the user has inputted an instruction of modifying or correcting a position of the contour information relating to the readout image data (hereafter, referred to as "contour correction instruction"), with respect to the contour extraction result image which is presented to the user by the image displaying unit 13. When this contour correction instruction is received, the instruction detecting unit 14 transmits information included in the contour correction instruction to the contour extracting unit 12.

Moreover, the instruction detecting unit 14 also detects if the user has determined the contour information to be accurate after the contour extraction result image is presented to the user by the image displaying unit 13 and also if the user has inputted an instruction of executing distortion correction processing (hereinafter, referred to as "image correction instruction") for the readout image data using this contour information. When this image correction instruction is received, the instruction detecting unit 14 transmits information on receipt of the image correction instruction to the image correcting unit 15.

When the image correction instruction is received from the instruction detecting unit 14, the image correcting unit 15 corrects the distortion of the medium area in the readout image data based on the contour information extracted by the contour extracting unit 12. The image correcting unit 15 transmits the readout image data which has been subjected to the distortion correction processing not only to the image displaying unit 13 for presenting the distortion-corrected image to the user but also to the image output unit 16.

The image output unit 16 outputs the readout image data, which has been subjected to the distortion correction processing performed by the image correcting unit 15, to an external equipment 30, such as a storage device or a printer.

The image processing apparatus 1 is a computer that includes a CPU (Central Processing Unit), a RAM (Random Access Memory), a ROM (Read Only Memory), and the like as a physical structure. All or parts of the functions of the image processing apparatus 1 mentioned above are realized in a way that an application program stored in the ROM is loaded in the RAM and executed by the CPU and thus data is written in and read out of the RAM or the ROM. Moreover, the image processing apparatus 1 includes an input device, such as a keyboard or a mouse, a displaying device, such as a display, and a communication device, such as an input/output port. The application program executed by the CPU uses these devices to allow instruction input operations by the user and to perform inputting readout image data, displaying the contour information and the corrected readout image data, and outputting the contour information and the corrected readout image data to the external equipment 30, and consequently, all or parts of the respective functions of the image processing apparatus 1 mentioned above are realized.

Moreover, the above-mentioned application program may be stored in a computer-readable recording medium or may be configured as a program product. Here, the term "recording medium" represents arbitrary "portable physical recording medium", such as memory cards, USB memories, SD cards, flexible disks, magnetic disks, ROMs, EPROMs, EEPROMs, CD-ROMs, MOs (magneto-optical disks), DVDs, Blu-ray disks, etc. Moreover, the application program may be stored in an application program server connected to the image processing apparatus 1 through an arbitrary network, and can be partially or entirely downloaded as appropriate.

Figure 2:
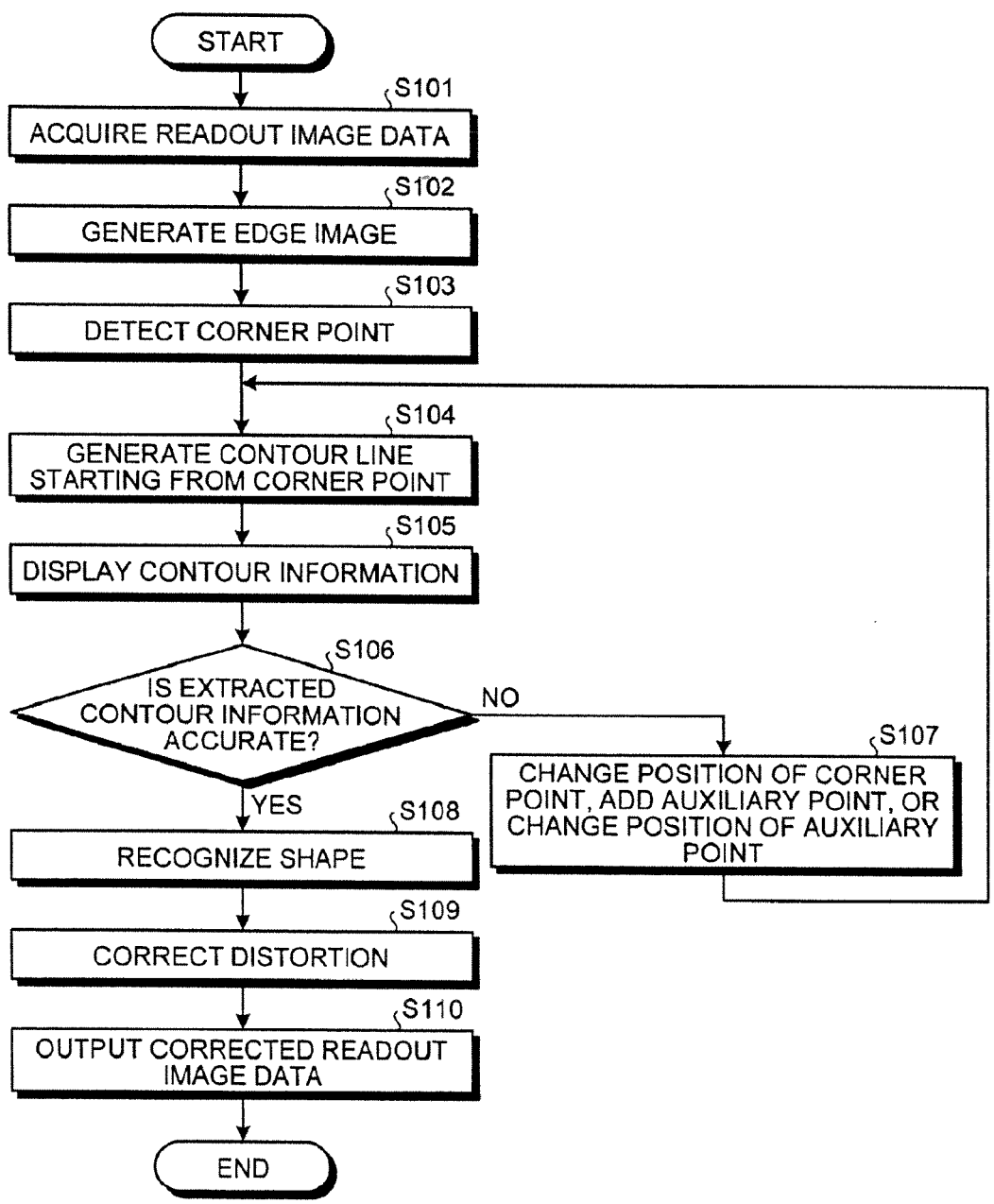
FIG. 2 is a flowchart that illustrates distortion correction processing executed by the image processing apparatus according to the first embodiment.
Figure 3:
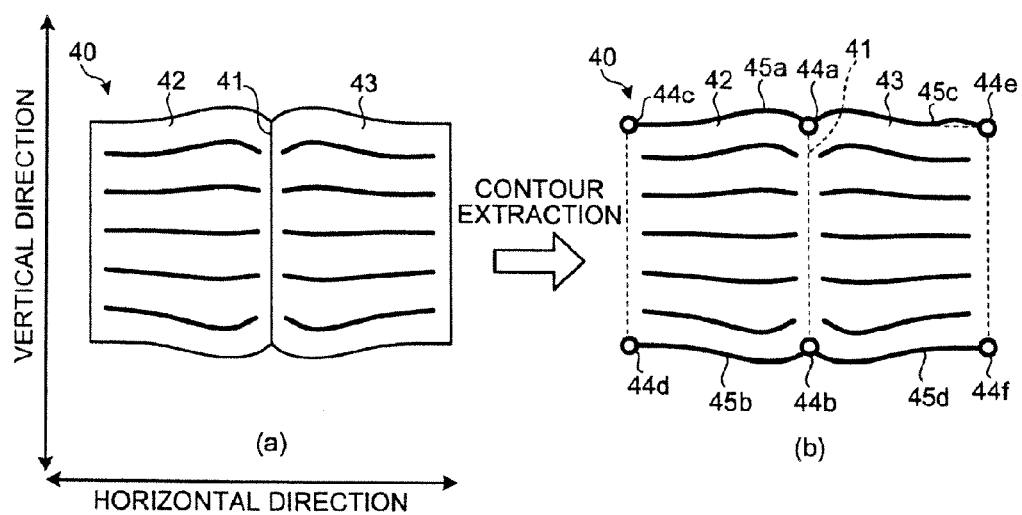
FIG. 3 is a diagram that illustrates contour information extraction processing.
Figure 4:
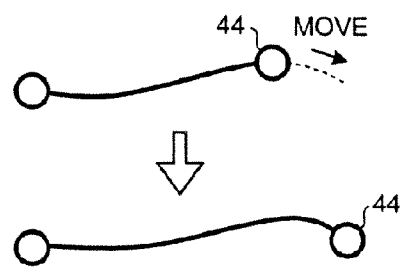
FIG. 4 is a diagram that illustrates a correction of a position of a corner point.
Figure 5A:
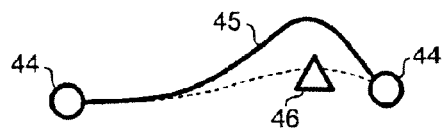
FIGS. 5A to 5C are diagrams that illustrate a correction process of a contour line by adding an auxiliary point.
Figure 5B:
Figure 5C:
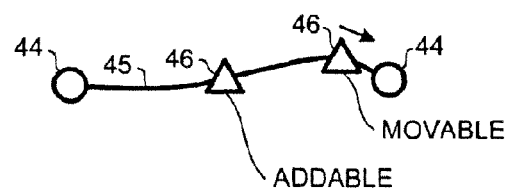
Figure 6:
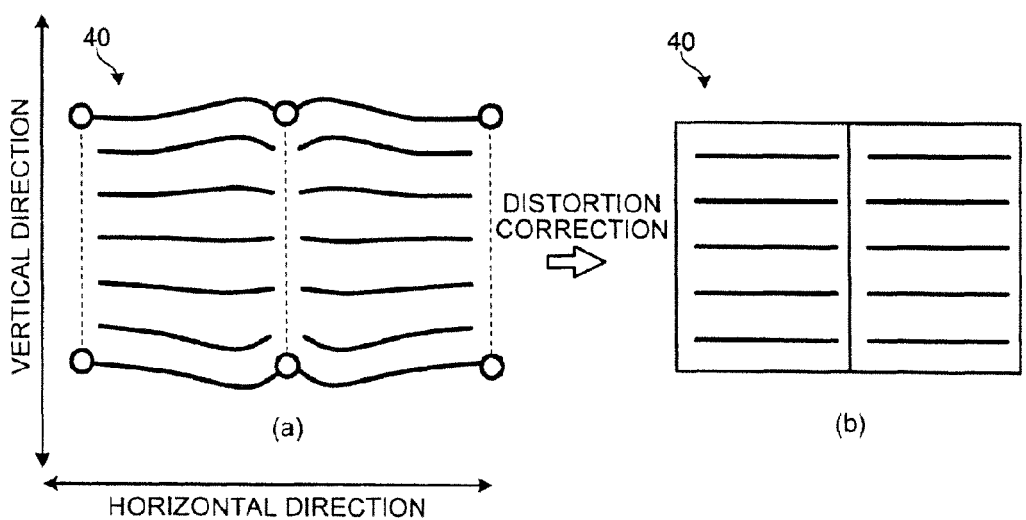
FIG. 6 is a diagram that illustrates a correction of a distortion of readout image data based on the corrected contour information.

Next, the operation of the image processing apparatus 1 according to the present embodiment is described with reference to FIGS. 2 to 6. FIG. 2 is a flowchart of distortion correction processing executed by the image processing apparatus 1 of the present embodiment, FIG. 3 is a diagram that illustrates contour information extraction processing, FIG. 4 is a diagram that illustrates corner point position correction processing, FIGS. 5A to 5C are diagrams that illustrate contour line correction processing of adding auxiliary points, and FIG. 6 is a diagram that illustrates distortion correction processing for readout image data based on corrected contour information.

The distortion correction processing executed by the image processing apparatus 1 is described with reference to the flowchart of FIG. 2. Further, the following description is made, by way of example, in connection with a case where the double-page spread type medium (see FIG. 3) is used as the reading target medium.

First, the image acquiring unit 11 acquires readout image data from the scanner device 20 (Step S101: acquiring step). When the medium as the reading target is the double-page spread type medium, as illustrated in FIG. 3(*a*), a medium area 40 included in the readout image data shows a state in which a binding portion 41 is arranged at the center, and pages 42 and 43 are arranged on both sides of the binding portion 41, and the left and right pages 42 and 43 include curved contours. The image acquiring unit 11 transmits the acquired readout image data to the contour extracting unit 12.

Next, the contour extracting unit 12 performs edge detection processing on the readout image data received from the image acquiring unit 11, and generates an edge image by extracting the boundary (edge) between the medium area 40 and the background from the readout image data (Step S102). Subsequently, corner points that indicate the positions of the corners of the medium area are detected using the edge image (Step S103: extracting stop). Specifically, in the case of the double-page spread type medium, as illustrated in FIG. 3(*b*), the medium has six corner points including a corner point 44*a* at the upper end of the binding portion 41, a corner point 44*b* at the lower end of the binding portion 41, a corner point 44*c* at the upper corner of the left page 42, a corner point 44*d* at the lower corner of the left page 42, a corner point 44*e* at the upper corner of the right page 43, and a corner point 44*f* at the lower corner of the right page 43.

Then, the contour lines that connect two corner points at the upper end of the page and that connect two corner points at the lower end of the page, each starting from one of the corner points detected, are generated by the contour extracting unit 12 (Step S104: extracting step). In this embodiment, in the case of the double-page spread type medium, as illustrated in FIG. 3(*b*), the contour lines corresponding to the upper ends and the lower ends of the pages of the double-page spread type medium are extracted. Specifically, four contour lines are extracted including an upper contour line 45*a* and a lower contour line 45*b* of the left page 42 and an upper contour line 45*c* and a lower contour line 45*d* of the right page 43. The contour lines can be generate using the well-known dynamic programming (Dynamic programming: DP).

More specifically, the contour extracting unit 12 generates the contour line 45*a* corresponding to the upper end of the left page 42 by generating the track from one of the corner point 44*a* at the upper end of the binding portion 41 or the corner point 44*c* at the upper corner of the left page 42, as a starting point, to the corner point 44*c* or the corner point 44*a*, respectively, using the dynamic programming. Similarly, the contour line 45*b* corresponding to the lower end of the left page 42 is generated by generating the track from one of the corner point 44*b* at the lower end of the binding portion 41 or the corner point 44*d* at the lower corner of the left page 42, as a starting point, to the corner point 44*d* or the corner point 44*b*, respectively, using the dynamic programming. Similarly, the contour line 45*c* corresponding to the upper end of the right page 43 is generated by generating the track from one of the corner point 44*a* at the upper end of the binding portion 41 or the corner point 44*e* at the upper corner of the right page 43, as a starting point, to the corner point 44*e* or the corner point 44*a*, respectively, using the dynamic programming. Similarly, the contour line 45*d* corresponding to the lower end of the right page 43 is generated by generating the track from one of the corner point 44*b* of the lower end of the binding portion 41 or the corner point 44*f* at the lower corner of the right page 43, as a starting point, to the corner point 44*f* or the corner point 44*b*, respectively, using the dynamic programming.

The contour extracting unit 12 transmits the detected six corner points 44*a* to 44*f* (hereinbelow, collectively called corner points 44) and the four generated contour lines 45*a* to 45*d* (hereinbelow, collectively called contour lines 45) to the image displaying unit 13 as the contour information of the medium area 40 of a double-page spread type medium.

Next, the contour information extracted by the contour extracting unit 12 is displayed by the image displaying unit 13 on the displaying device such as the display (Step S105: displaying step). For example, as illustrated in FIG. 3(*b*), the image displaying unit 13 generates a contour extraction result image by superposing the contour information, that is, the corner points 44 and the contour lines 45, on the contour of the medium area of the readout image data, and displays the contour extraction result image on the image displaying unit 13 so that the contour extraction result image is presented to the user.

Based on the contour extraction result image displayed by the image displaying unit 13, the extracted contour information in the readout image data is compared with the actual contour of the double-page spread type medium, so that the accuracy thereof is determined by the user. Subsequently, the user confirms whether the contour information is correct (Step S106: detecting step). When an instruction based on the result is input by the user through the input device, the instruction detecting unit 14 detects the instruction. When the contents of the instruction detected by the instruction detecting unit 14 is a "contour correction instruction" that is an instruction of changing the positions of the contour information with respect to the readout image data, the contour information is determined to be inaccurate and thus the contour correction instruction is transmitted to the contour extracting unit 12, and the distortion correction processing proceeds to Step S107. On the other hand, when the contents of the instruction is an "image correction instruction" that is an instruction of executing the distortion correction processing with respect to the readout image data using this contour information, the contour information is determined to be accurate and the image correction instruction is transmitted to the image correcting unit 15, and the distortion correction processing proceeds to Step S108.

When the contour information is determined to be inaccurate in Step S106, the contour information is corrected by the contour extracting unit 12 based on the contour correction instruction (Step S107). The correction information on the contour information included in the contour correction instruction is, specifically, that of correcting the position of the corner point 44, adding an auxiliary point 46, or correcting the position of the auxiliary point 46. When the user inputs the instruction relating to the correction of the position of the corner point 44, the instruction detecting unit 14 detects the instruction by movement of the corner point 44 caused by a dragging and dropping operation performed by the user, as illustrated in FIG. 4, for example. In the example of FIG. 4, since the position of the corner point 44 detected is in the left side of the correct position, the position is moved rightward by the user's operation.

The addition of the auxiliary point 46 is described with reference to FIGS. 5A to 5C. The auxiliary point 46 is a point newly added to correct the track of the contour line 45. The auxiliary point 46 is added to this track so that the contour line 45 which is currently presented as illustrated in FIG. 5A is changed to the track (indicated by a dotted line in FIG. 5A) of the contour line desired by the user. The user inputs the instruction regarding the addition of the auxiliary point 46, and the instruction detecting unit 14 detects the instruction by a click operation at an arbitrary cursor position to which the user wants to add the auxiliary point 46.

When the auxiliary point 46 is added, as illustrated in FIG. 55, the contour line 45 is regenerated in Step S104, which is described later, so as to pass through two corner points 44 disposed at both ends and the newly-added auxiliary point 46. Moreover, as illustrated in FIG. 5C, after the contour line 45 is regenerated, the auxiliary point 46 can be moved to correct the position thereof by the user's dragging and dropping operation. Moreover, another new auxiliary point 46 can be further added.

Subsequently, returning to Step S104, the contour line 45 is regenerated by the contour extracting unit 12, for example, as illustrated in FIGS. 5B and 5C (redoing extraction step) by reflecting the position information of the corner point 44 whose position is changed or the Position information of the auxiliary point 46 which is added or changed in position in Step S107. Again, in step s105, the contour information (the corner points 44, the contour lines 45, and the auxiliary points 46) extracted again by the contour extracting unit 12 is displayed in a state of being drawn on the medium area 40 of the readout image data (redisplaying step). Processing of Step S104 to Step S107 is repeated until the contour information is determined to be accurate in Step S106.

The contour information becomes exactly coincident with the contour of the medium area 40 through this contour information correction processing. The contour information which needs to be corrected, for example, that of the contour line 45 (contour line 45c) a part of which is shifted from the edge of the page as illustrated in FIG. 3(b), is corrected as illustrated in FIG. 6(a), for example, so that it becomes coincident with the edge of the medium area.

When the contour information is determined to be accurate in Step S106, the shape of the medium area 40 of the readout image data is recognized based on the contour information by the image correcting unit 15 (Step S108), and, for example, the distortion of the medium area 40 is corrected from the state of FIG. 6(a) to the state of FIG. 6(b) (Step S109).

The corrected readout image data is transmitted to the image displaying unit 13 to be presented to the user and also transmitted to the image output unit 16 to be output to the external equipment 30 (Step S110).

Next, function and effect of the image processing apparatus 1 according to the present embodiment is described.

The image processing apparatus 1 of the present embodiment is an image processing apparatus for readout image data that extracts the contour information of the medium area 4C from the readout image data including the medium area 4C corresponding to the medium serving as a reading target, and corrects the distortion of the medium area based on the extracted contour information. The image processing apparatus 1 includes the image acquiring unit 11 that acquires the readout image data, the contour extracting unit 12 that extracts the contour information of the medium area 40 from the readout image data acquired by the image acquiring unit 11, the image displaying unit 13 that displays the contour information extracted by the contour extracting unit 12 to be superposed on the readout image data, and the instruction detecting unit 14 that detects an instruction (contour correction instruction) of changing the positions of the contour information displayed by the image displaying unit 13 with respect to the readout image data. When the contour correction instruction is detected by the instruction detecting unit 14, the contour extracting unit 12 extracts again the contour information by reflecting the contour correction instruction. The image displaying unit 13 redisplays the contour information extracted again by the contour extracting unit 12.

With this configuration, the contour information of the medium area used to correct the distortion of the medium area 40 within the readout image data can be corrected according to the user's contour correction instruction, and thus the processing of correcting the distortion of the readout image data can be performed by using the exact contour information which is corrected. Accordingly, the correction accuracy of the correction processing on the readout image data can be improved.

Here, assumed is a case where the scanner device 20 that generates the readout image data is an overhead scanner that captures an image of a medium placed on a mounting table from above, and, specifically, the overhead scanner 20 is an swing head type one having an imaging unit that performs a rotation movement along a rotational shaft parallel to the scanning direction, and configured to read the entire medium by the rotation movement of the imaging unit. In this type of the scanner device, the distance to the medium varies depending on the rotational movement of the imaging unit. Accordingly, the degree of the distortion in a single piece of the readout image data varies along the direction of the rotational movement of the imaging unit. In particular, when the medium as the reading target is the double-cage spread type medium, and the binding portion 41 is disposed along the direction of the rotational movement of the imaging unit, the shapes of upper and lower curvatures of each of the left and right pages 42 and 43 may be different from each other.

As for this readout image data, when the contour information of the medium area 40 cannot be extracted accurately, it is difficult to deal with the curvature distortion that varies continuously within the page and therefore there is a concern that the accuracy of the distortion correction decreases. Since the image processing apparatus 1 of the present embodiment can individually extract the upper and lower contour lines of the page again, and can accurately extract each of the contour lines with good accuracy, the image processing apparatus 1 can perform the correction accurately even for the readout image data where the degree of distortion varies within a single page imaged by the swing head type overhead scanner.

Moreover, in the image processing apparatus 1 of the present embodiment, the contour information includes the contour line 45 that connects between one corner point 44 and another contour point 44 at the upper end or the lower end of the page of the medium area 40, and the contour correction instruction includes at least either one of instructions regarding the positional change of the corner point 44 and that regarding the addition of the auxiliary point 46 to the contour line 45 or the positional change of the auxiliary point 46. In the image processing apparatus 1, when the positional change of the corner point 44 is instructed, the contour extracting unit 12 corrects the contour line 45 by reflecting the corner point whose position has been changed, and when the addition of the auxiliary point 46 is instructed, the contour extracting unit 12 corrects the contour line 45 based on the corner point 44 and the auxiliary point 46.

With this configuration, the extracted contour information is displayed in a state of being superposed on the edge of the medium area of the readout image data as the corner points 44 and the contour lines 45, which allows the user to intuitively confirm a level of the accuracy of the contour information. Therefore, the accurate contour information can be promptly acquired, and the curvature correction processing of the readout image data can be efficiently performed. Moreover, since the contents of the contour correction instruction is only either one of the positional change of the corner point 44 and the addition and/or the positional change of the auxiliary point 46, an input operation of inputting the contents of the change instruction can be simplified.

Second Embodiment

Figure 7:
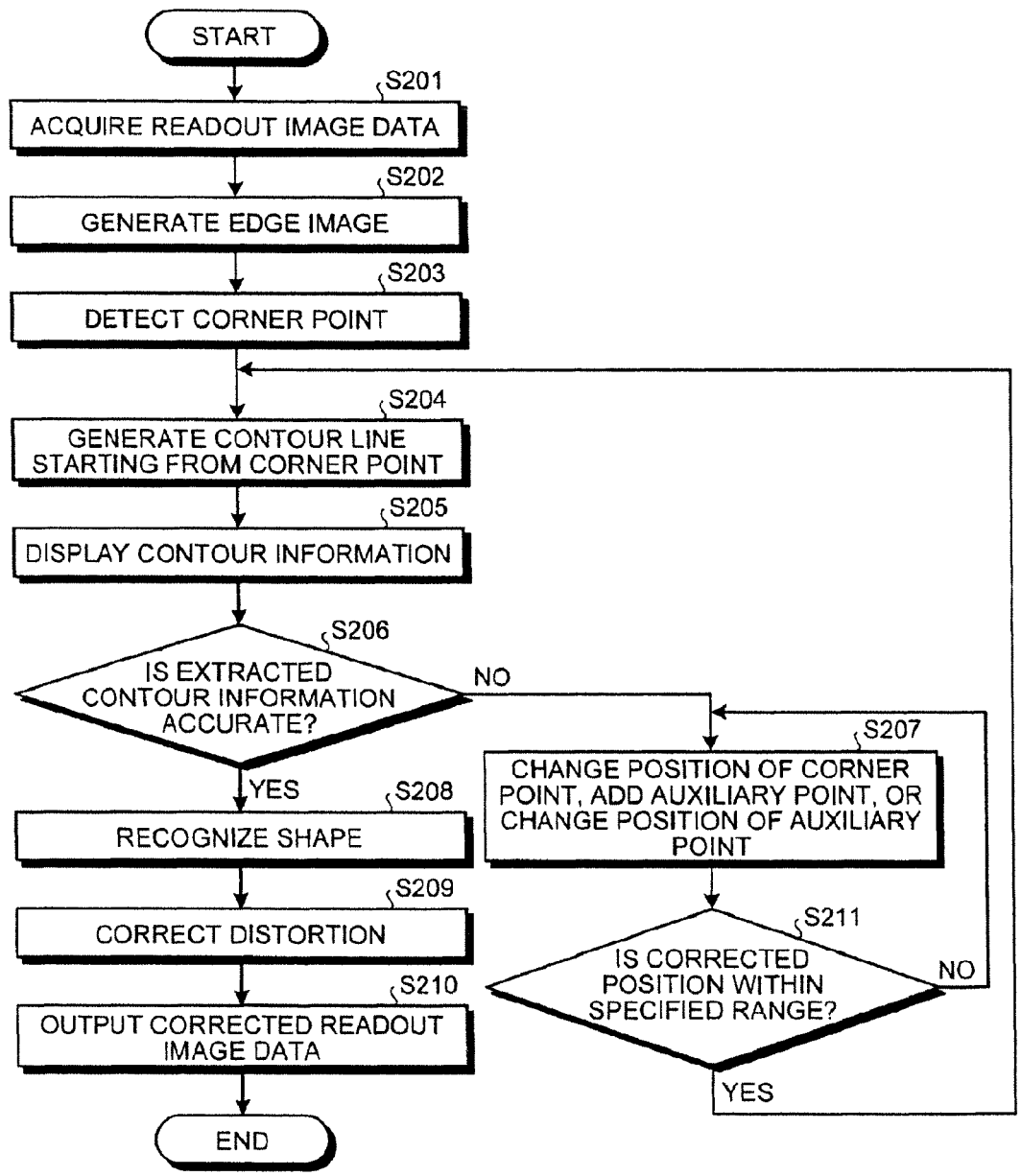
FIG. 7 is a flowchart that illustrates distortion correction processing executed by an image processing apparatus according to a second embodiment.

Next, a second embodiment of the present invention is described with reference to FIG. 7. FIG. 7 is a flowchart of distortion correction processing executed by an image processing apparatus of the second embodiment.

This embodiment is different from the first embodiment in that, when contour information specified by a contour correction instruction, that is, a changed position of the corner point 44 or the auxiliary point 46 is away from a position of original contour information beyond a specified range, the distance is determined to be outside an allowable range within which the positional correction is performed, and thus the contour correction instruction is not accepted and the contour information is not corrected.

This difference is described with reference to the flowchart of FIG. 7. Since Step S201 to Step S210 of the flowchart of FIG. 7 are identical with Step S101 to Step S110 of the first embodiment, the description is not repeatedly given.

When an instruction (contour correction instruction) of changing the position of the corner point 44 or adding (or changing the position of) an auxiliary point 46 is acquired by the contour extracting unit 12 in Step S207, it is confirmed whether the changed position of the corner point 44 or the auxiliary point 46 based on the correction instruction is in a specified range from a position of the original contour information (Step S211). This specified range can be set in advance and can be set to an area of several pixels or several millimeters from a track of the contour line 46 of the original correction information in the orthogonal direction, for example. Or, it may be set to an area of a predetermined distance or less in the centrifugal direction from the corner point 44 or the auxiliary point 46 of the original correction information.

When the changed position is within the specified range (YES in Step S211), returning to Step S204, the contour line 45 is generated again by the contour extracting unit 12 reflecting the contour correction instruction.

When the changed position is determined to be outside the specified range (NO in Step S211), the contour correction instruction which is input this time is determined to be false data, which is outside the allowable range within which the positional correction is performed, due to, for example, an erroneous input by the user, and the information on the correction position is reset. Then, returning to Step S207, the re-input of the contour correction instruction is awaited.

In the second embodiment, because of this configuration, a false contour correction instruction attributable to an erroneous input of the correction instruction is prevented from being used for the correction of the contour information, the correction efficiency of the contour information can be improved, and exact contour information can be far more promptly acquired. Moreover, even when the contour information which is initially extracted deviates greatly from an original contour, and when the desired changed position of the corner point 44 or the auxiliary point 46 is outside the specified range, by repeating the correction within the specified range a plurality of times, the desired correction can be performed.

Third Embodiment

Figure 8:
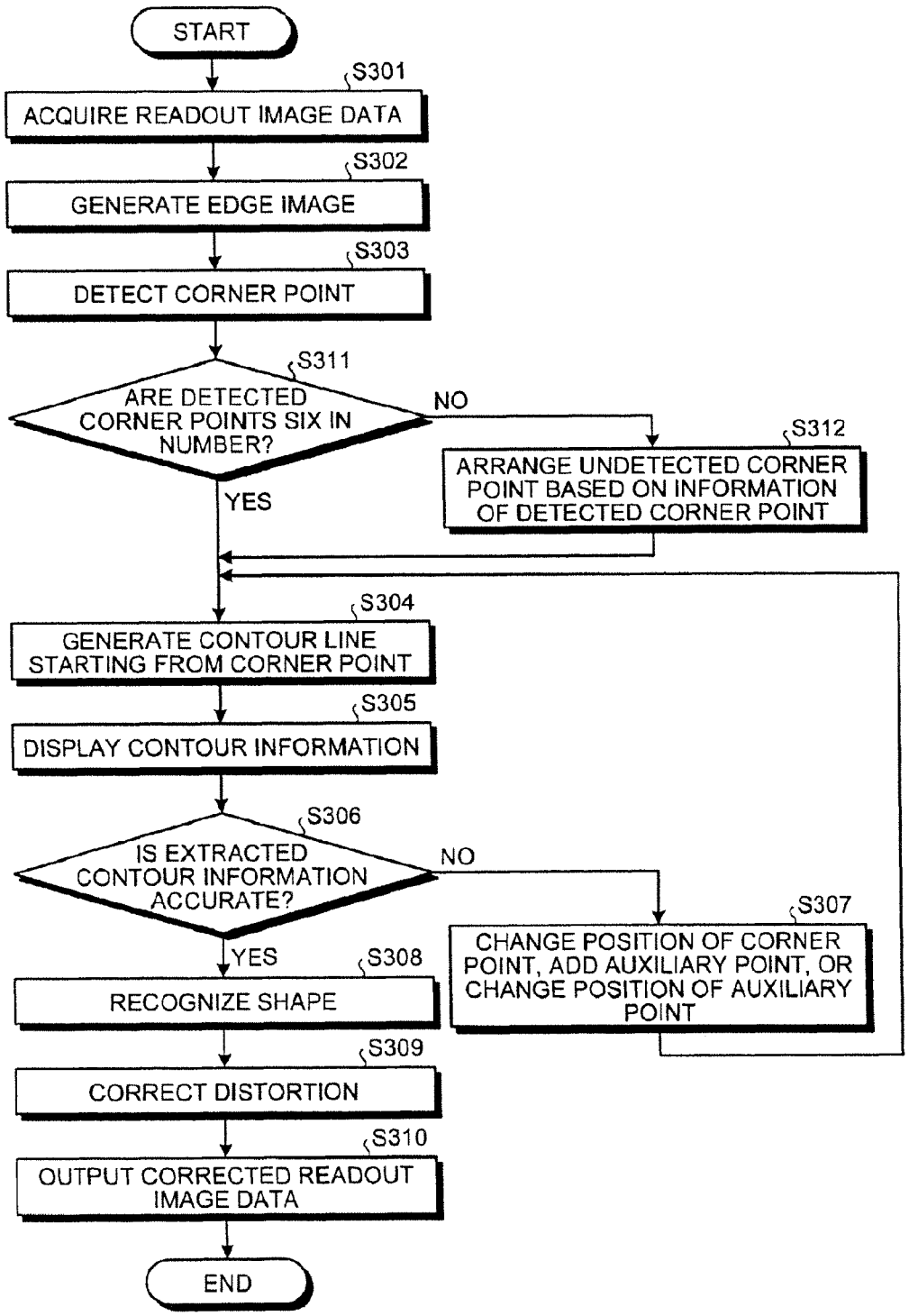
FIG. 8 is a flowchart that illustrates distortion correction processing executed by an image processing apparatus according to a third embodiment.

Next, a third embodiment of the present invention is described with reference to FIGS. 8 and 9. FIG. 8 is a flowchart of distortion correction processing executed by an image processing apparatus of the third embodiment, and FIGS. 9A and 9B are diagrams that illustrate a method of arranging undetected corner points.

The present embodiment is different from the first embodiment in that, when contour information corresponding to one page of a double-page spread type medium within a medium area (part of corner points 44) cannot be extracted, the contour information corresponding to the one page which could not be extracted is generated based on the contour information (corner points) corresponding to the other page, of which the contour information has been extracted.

This difference is described with reference to the flowchart of FIG. 8. Since Step S301 to Step S310 of the flowchart of FIG. 8 are identical to Step S101 to Step S110 of the first embodiment, the description thereof is not repeatedly given.

When the corner points 44 are detected in Step S303, it is confirmed whether the corner points 44 corresponding to six locations, i.e., the corner points 44*a* to 44*f*, have been detected by a contour extracting unit 12 (Step S311). Here, a situation, where the contour extracting unit 12 fails to detect all of the six corner points 44*a* to 44*f*, may occur when the color of the medium area 40 is similar to the color of a background 47 as illustrated in FIG. 9A, for example. In the example of FIGS. 9A and 9B, the edges of the left page 42 are successfully detected, but the edges of the right page 43 are failed to be detected because the color of the right page 43 is similar to the color of the background 47, which results in a failure to detect the corner point 44*e* at the upper corner of the right page 43. Consequently, the contour line 45*c* corresponding to the upper end of the right page 43 cannot be generated because of the failure to detect the corner point 44*e* at the upper corner of the right page 43.

Figure 9A:
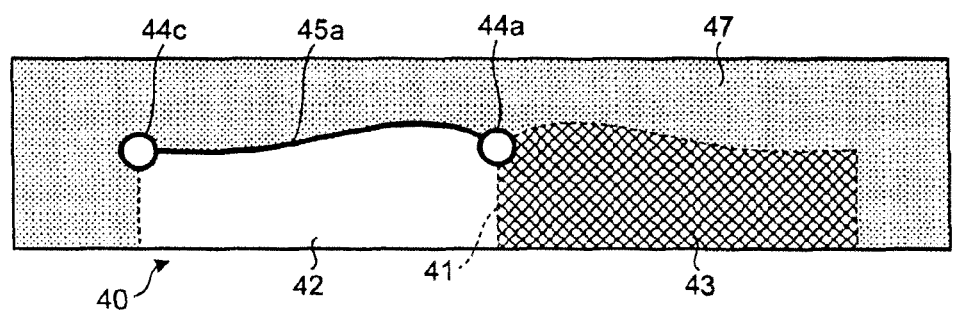
FIGS. 9A and 9B are diagrams that illustrate a method of arranging undetected corner points.

In a situation shown in FIG. 9A, for example, when it is determined that not all of the six corner points are detected, the undetected one(s) of the corner points 44 are arranged based on the information on detected one(s) of the corner points 44 (Step S312). For example, when the corner point 44*e* at the upper corner of the right page 43 is failed to be detected as illustrated in FIG. 9A, a point plotted at a position which is symmetrical to the corner point 44*c* at the upper corner of the left page 42 with respect to the binding portion 41 serving as the axis of symmetry as illustrated in FIG. 9B, and the plotted point is arranged as the corner point 44*e* which was undetected. Further, the contour line 45 may be generated by reversing the contour line 45*a* of the left page 42 over the binding portion 41 serving as the axis of symmetry, or may be generated by performing the dynamic programming between the corner point 44*e* which is newly arranged and the corner point 44*a* at the upper end of the binding portion 41.

Figure 9B:
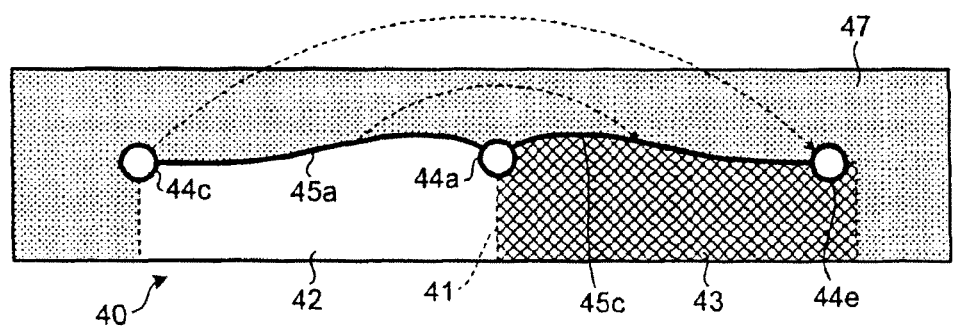

Moreover, when corner points 44*c* and 44*e* at both the corners of the left and right pages are detected, and the corner point 44*a* at the upper end of the binding portion 41 is failed to be detected, for example, the corner point 44*c*, which was undetected, can be arranged at a midway position between the corner point 44*c* and the corner point 44*e*, though it is not illustrated in FIGS. 9A and 9B. In addition, when neither the corner points 44 nor the contour lines 45 could be detected, imaginary contour information assuming a general size of paper may be displayed.

On the other hand, when it is determined that the six corner points are detected in Step S311, the processing proceeds to Step S304 and the subsequent processing of Step S304 to Step S310 is performed.

In the third embodiment, with this configuration, even in a situation where the contour information of the medium area 40, e.g., corner points 44, cannot be detected from the readout image data completely, contour information, which was undetected, can be generated based on other pieces of contour information or provisional contour information. Accordingly, even in the case where the color of the medium or the medium area is similar to the color of the background, for example, the contour information which is necessary to correct the distortion can be generated even for the readout image data from which the contour information could not be extracted and the distortion correction could not be executed by conventional arts. As such, even when the contour information is insufficiently extracted, if the contour information can be generated, correction processing can be performed by using the contour information and appropriate contour information can be obtained by the correction processing. As a result, the range of the readout image data, to which the distortion correction processing can be applied, can be increased, and therefore the image processing apparatus 1 would have wider application.

Although the embodiments of the present invention have been described, the above embodiments are presented only as examples, and are not intended to limit the scope of the invention. These embodiments can be implemented in other various modes, and various omissions, replacements, and changes can be made to the embodiments without departing from the scope of the invention. For example, the contour line whose distortion is corrected is not limited to the one(s) at the upper end or at the lower end of the page. The distortion correction may be performed to the contour line connecting the corner point at the upper end of the page, e.g., 44*c*, and the corner point at the lower end of the page, e.g., 44*d*, when this contour line is distorted. Like these embodiments and modifications thereof fall within the scope of the invention, the embodiments and the modifications thereof also fall within the scope of the invention described in the claims and their equivalents.

For example, in the above embodiments, the description has been made, by way of example, in connection with the cases where the origin of the readout image data is mainly a double-page spread type medium such as a book, but the medium as a reading target may be a medium other than the double-page spread type medium. In particular, when the scanner device 20 is a type that reads a medium mounted on a mounting table from above, such as an overhead scanner, such a situation may be considered that the corners of a page are likely to be rolled up or a page is likely to be waving even if a reading target is a medium, such as a sheet of paper because a reading target surface of the medium is not pressed flat, resulting in distortion of contour lines not only at the upper end or at the lower end of the page but also at end(s) other than the upper or lower end, and in distortion of the readout image data. However, since the image processing apparatus 1 of the present invention can extract the contour information accurately even from such a medium area being distorted, the image processing apparatus 1 can appropriately correct the distortion.

Moreover, although the above-mentioned embodiment uses the dynamic programming to extract the contour information of the medium area 40 from the readout image data, other well-known contour extraction algorithms, such as a technique which causes the original (medium area) to be seen distinguishably from the background using a difference between the color of the original and the background color and a technique which emphasizes an edge component by filtering, can be used.

Moreover, although the contour information of the medium area 40 within the readout image data is configured to include the corner points 44 and the contour lines 45 of the medium area in the above embodiments, the contour information may be configured to include either one of the corner points or the contour lines, or configured to include other information related to the contour of the medium.

The image processing apparatus, the image processing method, and the image processing program recorded in the computer-readable medium according to the present invention can correct contour information of the medium area, which is used to correct the curvature of the medium area, based on the instruction of changing the position of the contour information with respect to the readout image data, and perform distortion correction processing on the readout image data by using the corrected and accurate contour information. As a result, an advantage of improving the correction accuracy of the correction processing for the readout image data can be obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus for processing image data containing an image of a medium to be read, the image processing apparatus comprising:
    a memory storing computer executable instructions; and
    a processor configured to execute the instructions to perform the following steps of:
        extracting contour information including a first corner point, a second corner point, and a first contour line of a medium area from the image data, the first contour line connecting the first corner point and the second corner point to each other;
        detecting an instruction of correcting the contour information, the instruction including a third corner point to be changed from the first corner point;
        changing the first corner point into the third corner point and changing the first contour line into a second contour line which connects the third corner point and the second corner point to each other to correct the contour information when a distance between the first corner point and the third corner point is less than a predetermined distance, and not changing the first corner point when the distance between the first corner point and the third corner point is equal to or greater than the predetermined distance;
        superposing the corrected contour information including the third corner point, the second corner point, and the second contour line on a contour of the medium area of the image data for displaying the corrected contour information when the distance between the first corner point and the third corner point is less than the predetermined distance; and
        superposing the extracted contour information including the first corner point, the second corner point and the first contour line of the medium area on the contour of the medium area of the image data for displaying the extracted contour information when the distance between the first corner point and the third corner point is equal to or larger than the predetermined distance.

2. An image processing method for processing image data containing an image of a medium to be read by a processor configured to execute computer executable instructions stored in a memory, the image processing method comprising:
    extracting contour information including a first corner point, a second corner point, and a first contour line of a medium area from the image data, the first contour line connecting the first corner point and the second corner point to each other;
    detecting an instruction of correcting the contour information, the instruction including a third corner point to be changed from the first corner point;
    changing the first corner point into the third corner point and changing the first contour line into a second contour line which connects the third corner point and the second corner point to each other to correct the contour information when a distance between the first corner point and the third corner point is less than a predetermined distance, and not changing the first corner point when the distance between the first corner point and the third corner point is equal to or greater than the predetermined distance;
    superposing the corrected contour information including the third corner point, the second corner point, and the second contour line on a contour of the medium area of the image data for displaying the corrected contour information when the distance between the first corner point and the third corner point is less than the predetermined distance; and
    superposing the extracted contour information including the first corner point, the second corner point and the first contour line of the medium area on the contour of the medium area of the image data for displaying the extracted contour information when the distance between the first corner point and the third corner point is equal to or larger than the predetermined distance.

3. A non-transitory computer-readable recording medium storing an image processing program for processing image data containing an image of a medium to be read, the image processing program causing the computer to perform the steps of:
    extracting contour information including a first corner point, a second corner point, and a first contour line of a medium area from the image data, the first contour line connecting the first corner point and the second corner point to each other;
    detecting an instruction of correcting the contour information, the instruction including a third corner point to be changed from the first corner point;
    changing the first corner point into the third corner point and changing the first contour line into a second contour line which connects the third corner point and the second corner point to each other to correct the contour information when a distance between the first corner point and the third corner point is less than a predetermined distance, and not changing the first corner point when the distance between the first corner point and the third corner point is equal to or greater than the predetermined distance;
    superposing the corrected contour information including the third corner point, the second corner point, and the second contour line on a contour of the medium area of the image data for displaying the corrected contour information when the distance between the first corner point and the third corner point is less than the predetermined distance; and
    superposing the extracted contour information including the first corner point, the second corner point and the first contour line of the medium area on the contour of the medium area of the image data for displaying the extracted contour information when the distance between the first corner point and the third corner point is equal to or larger than the predetermined distance.

* * * * *